United States Patent [19]

de Bruijne et al.

[11] Patent Number: 5,194,273
[45] Date of Patent: Mar. 16, 1993

[54] LAMINATED DOUGHS

[75] Inventors: Dirk W. de Bruijne, Vlaardingen; Theodorus J. Liefkens, Maassluis; Aleksander A. Reszka, Ridderkerk, all of Netherlands

[73] Assignee: Van den Bergh Foods Co., Division of Conopco Inc., Lisle, Ill.

[21] Appl. No.: 665,207

[22] Filed: Mar. 5, 1991

[30] Foreign Application Priority Data

Mar. 5, 1990 [EP] European Pat. Off. ......... 90200502.4

[51] Int. Cl.$^5$ .............................................. A21D 13/08
[52] U.S. Cl. ...................................... 426/94; 426/502; 426/556
[58] Field of Search ............................. 426/556, 94, 502

[56] References Cited

U.S. PATENT DOCUMENTS

| | | | |
|---|---|---|---|
| 2,625,893 | 1/1953 | Semple | 426/556 |
| 3,585,046 | 6/1971 | Schaible | 426/556 |
| 3,615,682 | 10/1971 | La Baw | 426/556 |
| 3,615,684 | 10/1971 | Workin | 426/556 |
| 4,416,910 | 11/1983 | Hayashi et al. | 426/502 |
| 4,622,226 | 11/1986 | Ke et al. | 426/556 |
| 4,647,467 | 3/1987 | Pinto | 426/556 |
| 4,907,501 | 3/1990 | Rijkaart | 426/502 |

FOREIGN PATENT DOCUMENTS

| | | |
|---|---|---|
| 464315 | 8/1928 | Fed. Rep. of Germany . |
| 923541 | 2/1955 | Fed. Rep. of Germany . |
| 748423 | 7/1933 | France . |

OTHER PUBLICATIONS

Samuel A. Matz, Ph.D., Formulas and Processes for Bakers, Pan-Tech International, Inc. 1987, pp. 40-56.

Primary Examiner—Jeanette Hunter
Assistant Examiner—Mary S. Mims
Attorney, Agent, or Firm—Rimma Mitelman

[57] ABSTRACT

A process is described for the preparation of laminated doughs, wherein the laminated dough has a number of fat layers having a different thickness. Such a dough is obtained by a process wherein the total amount of lamination fat is divided over several lamination steps. The invention is also concerned with a laminated dough, optionally in frozen condition and with baked products, obtained after baking of the dough.

13 Claims, 3 Drawing Sheets

PREPARATION OF INITIAL DOUGH WITH ONE MARGARINE/FAT LAYER

A HALF TURN IN THREE

LAMINATE (URL-FRENCH METHOD)

RESIDUAL AMOUNT OF MARGARINE

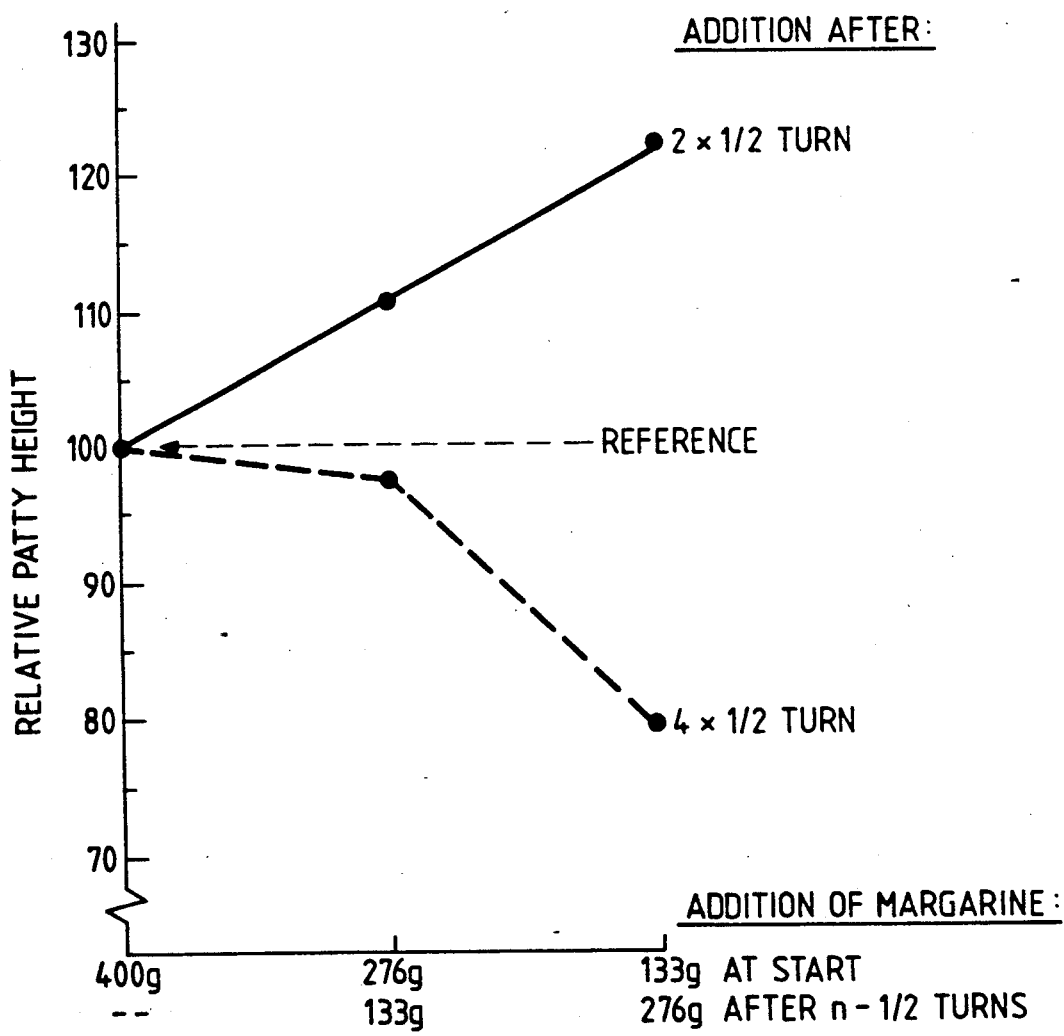

LAMINATED DOUGHS

So far a number of methods are known for the preparation of laminated doughs. From DE 464 315 a method is known by which a dough is carried through a number of roller pairs, in such a way that before every succeeding roller pair the dough is folded. The different roller pairs are provided with fat so that both the surfaces of the dough are covered with a fat layer before the dough is folded and squeezed again in the next roller pair. However, this process, in particular the folding of the dough, is difficult to control. Therefore, the process is complicated and does not always lead to a consistent end product. In another method, known as the French method, a layer of pre-made dough having a thickness of about 8 mm, is covered with a fat layer (pastry margarine) with a thickness of about 10 mm. The size of the dough is about twice the size of the fat layer. The fat layer is placed on top of the dough, in such a way that an envelope can be formed by closing the dough (see FIG. 1). The laminate thus formed is rolled on a rolling machine to a 10 mm thick rectangle. The rectangle is folded in three, turned over 90° and rolled again. This operation of folding, turning and rolling is repeated. This constitutes a so-called "whole turn in three" operation, consisting of 2 half turns (see FIG. 1.5-1.7). The procedure is repeated two or three times. The final laminate consists of 4 or 6 half turns, folded in three. The number of fat layers present in the dough is given by $3^n$ (n=number of half turns). In Table I the number of layers obtained after the indicated number of half turns as well as the thickness of the layers are illustrated.

TABLE 1

|  | ½ turns (n) | | | | | |
|---|---|---|---|---|---|---|
|  | 1 | 2 | 3 | 4 | 5 | 6 |
| $N_f$ | 3 | 9 | 27 | 81 | 243 | 729 |
| $N_t$ | 7 | 19 | 55 | 163 | 487 | 1,459 |
| Thickness of dough layer at 8 mm roll out. | 1.8 mm | 593μ | 198μ | 66μ | 22μ | 7.3μ |
| Thickness of fat layer at 8 mm roll out. | 0.9 mm | 296 | 99 | 33 | 11μ | 3.7 |
| Thickness of dough layer at 3.5 mm roll out. |  |  |  |  |  | 3.2μ |
| Thickness of fat layer at 3.5 mm roll out. |  |  |  |  |  | 1.6μ |

$N_f$ = number of fat layers after n ½ turns.
$N_t$ = total number of layers after n ½ turns.

The thickness of the fat layers, starting with a fat layer of 10 mm in the initial dough is given in Table I after the given number of ½ turns and after roll out to 8 mm or 3.5 mm. The fat layer thickness is half of the thickness of the dough layers.

In another method, known as the Dutch or Scotch method, the fat is added to the dough in the shape of small cubes. The rest of the process is the same. The end result is again a laminate-like dough, wherein the fat layers all have about the same thickness.

However, when the laminated doughs thus obtained are used in baking, it was found that the lift by baking of a puffed pastry was not optimal. A possible reason for this might be that the growth of the vapour bubbles, which are formed during the baking operation, is prevented by the thickness of the fat layers, which is too thin.

We now have found a method in which the same amount of fat is used as in the known processes, but which leads to products that possess an improved lift. Alternatively, less fat can be used when the same lift is required as for the known products. The process is easily controllable and leads to a consistent product.

Therefore, the process according to the invention consists in that the lamination of a normal dough and a fat composition is proceeded in such a way that in the laminated product a number of fat layers are formed having a thickness that differs from a number of other fat layers that are also formed.

BRIEF DESCRIPTION OF THE DRAWINGS

FIGS. 1(5)–1(7) demonstrates a half turn in three operation.

FIG. 3 illustrates the lift of the different doughs prepared in Example 1.

The lamination is carried out in a number of lamination steps, each comprising a number of half turns. In each half turn the thickness of the layers is reduced by a factor 2 or more, in particular by a factor 2–6, although we prefer a factor 3 or 4.

In particular, the lamination is carried out by using in the first lamination step 20–50 wt% of the total amount of fat that is normally used in the whole process. The remaining 80–50% of the lamination fat is applied in at least one lamination step later in the process. A normal amount of fat means the use of 300–500 g of fat per 500 g of flour.

Figure 1:
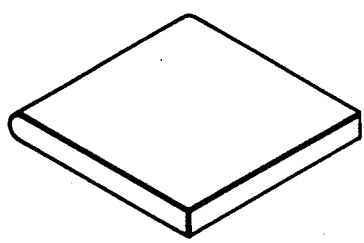
FIGS. 1(1)–1(4) demonstrate preparation of initial dough with one margarine/fat layer.
Figure 1:
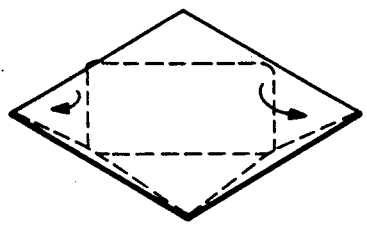
Figure 1:
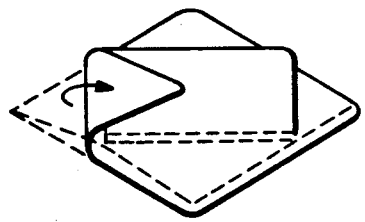
Figure 1:
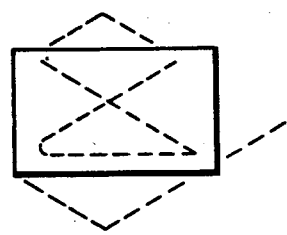
Figure 1:
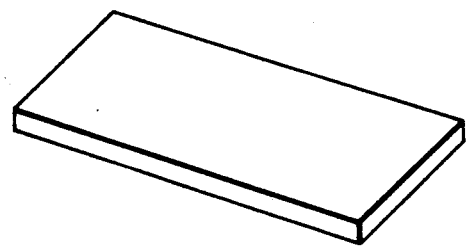
Figure 1:
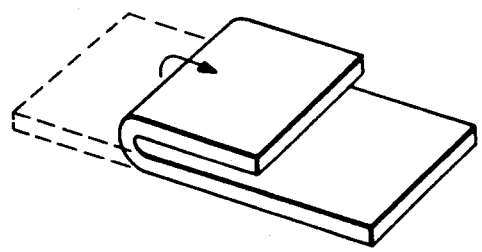
Figure 1:
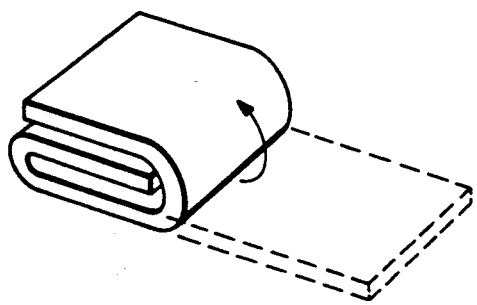

The first lamination step can be proceeded either as a French lamination or as a Dutch lamination. Therefore, in a process that we prefer in particular, the first lamination step is performed as illustrated in FIG. 1.1–1.4. However, in this first lamination step we use only part, preferably 20–50 wt%, of the total amount of fat, that is used in the whole process. The result of this first lamination step, after rolling of the three-layered system obtained after the folding of the dough, is a laminated dough, as illustrated in FIG. 1.5.

Figure 2:
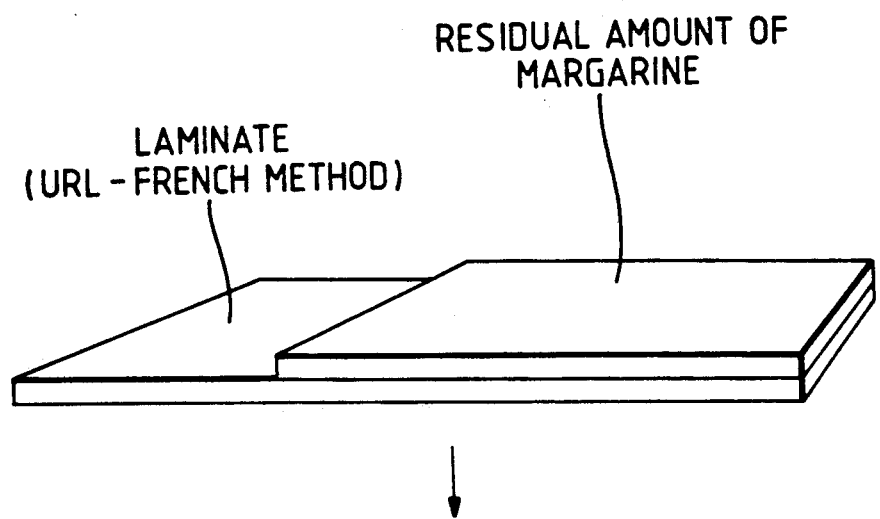
FIGS. 2(1)–2(3) demonstrate the preparation of laminated dough which is a sandwich of fat layers and dough layers.
Figure 2:
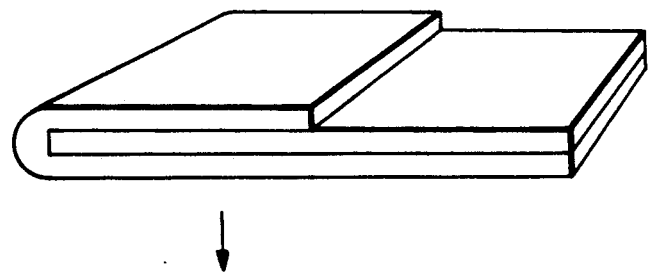
Figure 2:
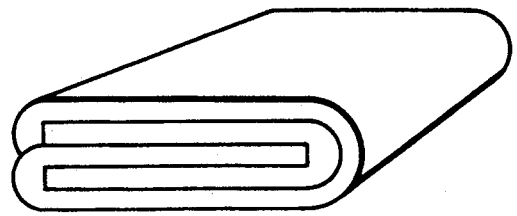

This dough is covered for ⅔ of its surface with another fat layer. The extending ⅓ of the dough layer that is not covered by the fat layer is folded over the fat layer. The combined fat layer and dough layer not covered by the folded dough layer is folded in such a way that a sandwich of fat layers and dough layers is obtained (cf. FIG. 2.1–2.3).

This sandwich is subjected to a reduction in layer thickness by using a calendering machine. The reduction factor being chosen in advance is preferably 3–4. The laminate so obtained is folded again in three, given a quarter turn and another reduction in thickness occurs, using the same reduction factor, although also another reduction factor could be used.

The number of later lamination steps is preferably just one, but it is also possible to use more later lamination steps. In fact, similar results can be obtained by using 2–5 later lamination steps. In the last case the amount of remaining fat is normally split up equally over the number of later lamination steps. However, in case a croissant is made, this remaining amount is always used after a first lamination, comprising one half turn, has been performed.

Preferably, in each lamination step 2-3 half turns are used, although also more or fewer half turns might be used. Each half turn can be in 3 to 6. In the whole lamination process a total of at least 4, preferably 5-6 half turns, are applied.

In the process according to the invention a margarine is preferably used as fat layer. However, the results, illustrated as patty height, depend on the type of margarine. When the margarine is too soft in the calendering step, no good margarine layer is formed. When the margarine is too hard, the dough layers are damaged. Therefore, we prefer to use a margarine with an $S_{20}$-value of at least 150, preferably with an $S_{20}$-value of 400–700. The $S_{20}$-value is determined by measuring the force (in grams) exerted by a sample, when it is penetrated by a bar probe, over a pre-set distance. This measurement can be performed, using a Stevens-LFRA Texture Analyser with a cylindrical probe of 4.4 mm. This technique is described, e.g., in our EP 0 350 983.

The invention also comprises doughs, wherein a number of fat layers have a different thickness. The thickness of the fat layers differs by a factor of 3 or more.

Especially the doughs according to the invention are characterised by the fact that one out of 9, respectively that one out of 27 fat layers has a thickness that is 9, respectively 27 times greater than the thickness of the other fat layers.

The dough can also be brought and kept in a frozen condition. These frozen doughs are also part of the invention.

Also puffed pastries, Danish pastries and croissants, which can be obtained after baking of the doughs according to the invention, are part of the invention.

EXAMPLE I

A dough was prepared by using the conventional amounts of normal dough ingredients. However, the amount of margarine, that was used (400 gram per 500 gram flour) added in different ways as indicated in Table 2. The lamination procedure that was used was the french-method.

TABLE 2

| | Amount of extra margarine | | |
|---|---|---|---|
| start | after 2 × ½ turn | after 4 × ½ turn | total |
| 400 | — | — | 400 |
| 267 | 133 | — | 400 |
| 133 | 267 | — | 400 |
| 267 | — | 133 | 400 |
| 133 | — | 267 | 400 |

In FIG. 3 the lift of the different doughs is illustrated by the use of the relative patty height of different patties made from the different doughs.

As can be concluded from these figures, excellent patty heights were obtained by adding the remaining 33% or 66% of the normal amount of laminating fat later in the production process, especially when added after 2 × ½ turn.

EXAMPLE II

Croissants were made from a dough having the composition according to Table 3.

TABLE 3

| Composition of dough | |
|---|---|
| Ingredient | Composition |
| Columbus flour | 100 g |
| Water | 58 |
| Yeast (Konings gist) | 5 |
| Salt | 2 |
| Sugar | 3 |
| Volufrost | 3 |
| Margarine (total) Alpha | 40 |

The preparation of the croissants was performed in the usual way, i.e. by using the following conditions:
kneading time: 6 min.
kneading temperature: 18°-19° C.
resting time after kneading: 10 min.
lamination, using 3 half turns to a thickness of 10 mm after each half turn.
resting time 10 min. at 5° C.
final rolling to about 3 mm thickness
resting time: 10 min.
shaping of the dough.

The total amount of margarine (40 g) was added in different ways in different lamination processes, as indicated in Table 4.

TABLE 4

| Added margarine | A | B | C |
|---|---|---|---|
| Start | 40 | 27 | 27 |
| After 1 × ½ turn | — | 13 | — |
| After 2 × ½ turn | — | — | 13 |

The croissants shaped were proofed at 35° C. for 60 min. (relative humidity 75-80%).

Part of the croissants was baked when fresh at 210° C. for 20 min.

Another part of the croissants was cooled at −30° C., packed in plastic material and stored at −20° C.

The frozen, pre-proofed croissants were baked without thawing at 230° C. for 20 min.

The results are given in Table 5.

TABLE 5

| Croissant type | A | B | C |
|---|---|---|---|
| S.V. of fresh croissant | 9.3 | 10.2 | 8.7 |
| S.V. after 1 hour at −30° C. | 7.9 | 9.0 | 6.2 |
| S.V. after 1 week at −20° C. | 7.0 | 7.5 | 6.1 |

As can be concluded from Table 5, the best results were always obtained with type B croissants, i.e. when applying 67% of the margarine at the start and 33% of the margarine after the first turn.

This applies, irrespective of the way in which the croissants were pre-treated.

We claim:

1. Process for the preparation of a laminated dough, suitable for puffed pastries, Danish pastries, and croissants, the process comprising laminating a normal dough and a fat composition in a number of lamination steps, each comprising a number of half turns, the steps comprising using 20-50 wt% of the total amount of fat that is normally used in the process in a first lamination step and using 80-50 wt. of the total fat in at least one lamination step later in the process so that in the laminated dough a number of fat layers are formed having a thickness that differs from a number of other layers.

2. The process according to claim 1, wherein the process comprises achieving a reduction in thickness by a factor of 2 or more in each half turn.

3. The process according to claim 2, wherein the process comprises achieving the reduction in thickness by a factor of three in each half turn.

4. The process according to claim 1, wherein the process comprises using 2-3 half turns in each lamination step.

5. The process according to claim 1, wherein the process comprises using half turns in 3-6.

6. The process according to claim 1, wherein the process comprises applying a total of at least 4 half turns in three in the whole lamination process.

7. The process according to claim 1, wherein the fat is a margarine with an $S_{20}$-value of at least 150.

8. The process according to claim 1, wherein the fat is a margarine with an $S_{20}$-value of 400-700.

9. Laminated dough comprising layers of dough and layers of fat, wherein the fat layers are of at least two different kinds, the kinds of fat layers distinguished from each other by different thicknesses, wherein the thickness of one kind of fat layers differs from the thickness of the second kind of fat layers by a factor of three or more.

10. The laminated dough of claim 9, wherein the dough comprises 9 fat layers, wherein one of the layers has a thickness that is 9 times greater than the total thickness of the other 8 fat layers.

11. The laminated dough of claim 9, wherein the dough comprises 27 fat layers, wherein one of the layers has a thickness that is 27 times greater than the total thickness of the other 26 fat layers.

12. Frozen, laminated dough, wherein the dough of claim 9 is in frozen condition.

13. Puffed pastries, Danish pastries and croissants obtained after baking of the laminated doughs of claim 9.

* * * * *